(12) United States Patent
Lacy

(10) Patent No.: US 11,015,481 B2
(45) Date of Patent: May 25, 2021

(54) TURBINE SHROUD BLOCK SEGMENT WITH NEAR SURFACE COOLING CHANNELS

(71) Applicant: General Electric Company, Schenectady, NY (US)

(72) Inventor: Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 16/015,268

(22) Filed: Jun. 22, 2018

(65) Prior Publication Data

US 2019/0390568 A1 Dec. 26, 2019

(51) Int. Cl.
*F01D 25/12* (2006.01)
*F01D 11/24* (2006.01)
*B33Y 10/00* (2015.01)

(52) U.S. Cl.
CPC .............. *F01D 25/12* (2013.01); *B33Y 10/00* (2014.12); *F01D 11/24* (2013.01); *F05D 2230/20* (2013.01); *F05D 2240/11* (2013.01); *F05D 2250/75* (2013.01); *F05D 2260/20* (2013.01); *F05D 2260/204* (2013.01)

(58) Field of Classification Search
None
See application file for complete search history.

(56) References Cited

U.S. PATENT DOCUMENTS

| | | | |
|---|---|---|---|
| 5,957,657 A | 9/1999 | Akita et al. | |
| 6,247,896 B1 | 6/2001 | Auxier et al. | |
| 6,905,302 B2 | 6/2005 | Lee et al. | |
| 8,109,726 B2 | 2/2012 | Liang | |
| 8,182,224 B1 | 5/2012 | Liang | |
| 8,360,726 B1 | 1/2013 | Liang | |
| 8,449,246 B1* | 5/2013 | Liang ........................ | F01D 9/04 415/115 |
| 9,624,779 B2 | 4/2017 | Schick et al. | |
| 9,757,936 B2 | 9/2017 | Lacy et al. | |
| 10,443,437 B2* | 10/2019 | Lacy ........................ | F01D 11/08 |
| 2008/0298975 A1 | 12/2008 | James et al. | |
| 2012/0057969 A1 | 3/2012 | Jiang et al. | |
| 2016/0186575 A1* | 6/2016 | Lacy ........................ | B22F 3/1055 416/95 |
| 2017/0101890 A1 | 4/2017 | Dutta et al. | |
| 2017/0175573 A1 | 6/2017 | Benjamin et al. | |

(Continued)

*Primary Examiner* — Juan G Flores
(74) *Attorney, Agent, or Firm* — Charlotte C. Wilson; James W. Pemrick

(57) ABSTRACT

A cooled structure has a leading edge, a trailing edge, a first side portion orthogonal to each of the leading and trailing edge, and a second side portion opposite the first side portion and substantially orthogonal to each of the leading and trailing edge. The cooled structure includes a substrate surface defined by boundaries including the leading edge, trailing edge, first side and second side portion. A first set of cooling channels beneath the substrate surface extends from a first set of inlets proximate to the first side portion to a first set of exits proximate to the second side portion. A second set of cooling channels beneath the substrate surface extends from a second set of inlets proximate to the second side portion to a second set of exits proximate to the first side portion. Each first inlet overlaps with an exit of the second set of exits.

20 Claims, 9 Drawing Sheets

(56) References Cited

U.S. PATENT DOCUMENTS

2017/0175576 A1    6/2017  Benjamin et al.
2017/0175580 A1    6/2017  Benjamin et al.
2018/0119570 A1*   5/2018  Lacy ...................... F01D 11/08

* cited by examiner

TURBINE SHROUD BLOCK SEGMENT WITH NEAR SURFACE COOLING CHANNELS

BACKGROUND

The disclosure relates generally to cooled structures of a gas turbine and more specifically to overlapping cooling channels routed to enhance edge cooling of the structures.

In a large frame heavy-duty industrial gas turbine engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature may be limited to the material properties of the turbine, especially the first stage vanes and blades, and an amount of cooling capability for these first stage airfoils.

The first stage rotor and stator components are exposed to the highest gas stream temperatures, with the temperature gradually decreasing as the gas stream passes through the turbine stages. The first and second stage airfoils (blades and vanes) should be cooled by passing cooling air through internal cooling passages and discharging the cooling air through film cooling holes to provide a blanket layer of cooling air to protect the cooled surface from the hot gas stream.

The turbine rotor blades rotate within a cooled surface formed by a shroud which forms a gap with the blade tips. The shroud is formed of many segments secured within a ring carrier. The hot gas flow from the first stage nozzle including the leakage that passes through the gap not only decreases the turbine efficiency but also creates hot spots on the shroud that result in erosion or other thermally-induced damage resulting in reduced part life.

SUMMARY

Aspects and advantages of the disclosure will be set forth in part in the following description, or may be learned through practice of the disclosure.

In one embodiment, a cooled structure has a leading edge, a trailing edge, a first side portion orthogonal to each of the leading and trailing edge, and a second side portion opposite the first side portion and substantially orthogonal to each of the leading and trailing edge. The cooled structure includes a substrate surface defined by boundaries including the leading edge, trailing edge, first side and second side portion. A first set of cooling channels beneath the substrate surface extends from a first set of inlets proximate to the first side portion to a first set of exits proximate to the second side portion. A second set of cooling channels beneath the substrate surface extends from a second set of inlets proximate to the second side portion to a second set of exits proximate to the first side portion. Each first inlet overlaps with and is closer to the substrate surface than at least one exit of the second set of exits. At least one of the first inlets feeds a channel side portion of at least one cooling air micro-channel of the first and second sets of cooling air micro-channels. The channel side portion includes a transition portion angled toward the substrate radially inner surface.

In another embodiment a structure includes a leading edge, a trailing edge opposite the leading edge, a first side portion substantially orthogonal to each of the leading edge and the trailing edge, and a second side portion opposite the first side portion and substantially orthogonal to each of the leading edge and the trailing edge. The structure includes a substrate surface defined by boundaries comprising the leading edge, the trailing edge, the first side portion and the second side portion. The substrate surface is exposed to hot fluid. A first set of cooling channels beneath the substrate surface extends from a first set of inlets proximate to the first side portion to a first set of exits proximate to the second side portion. Each cooling channel includes a channel side portion adjacent the first side portion. Each channel side portion is at least partially radially inward or radially outward of an adjacent channel side portion.

In another embodiment, the cooled structures described above are part of a gas turbine having a compressor section, a plurality of combustors in a combustion section positioned downstream from the compressor, and a turbine section positioned downstream from the combustion section.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
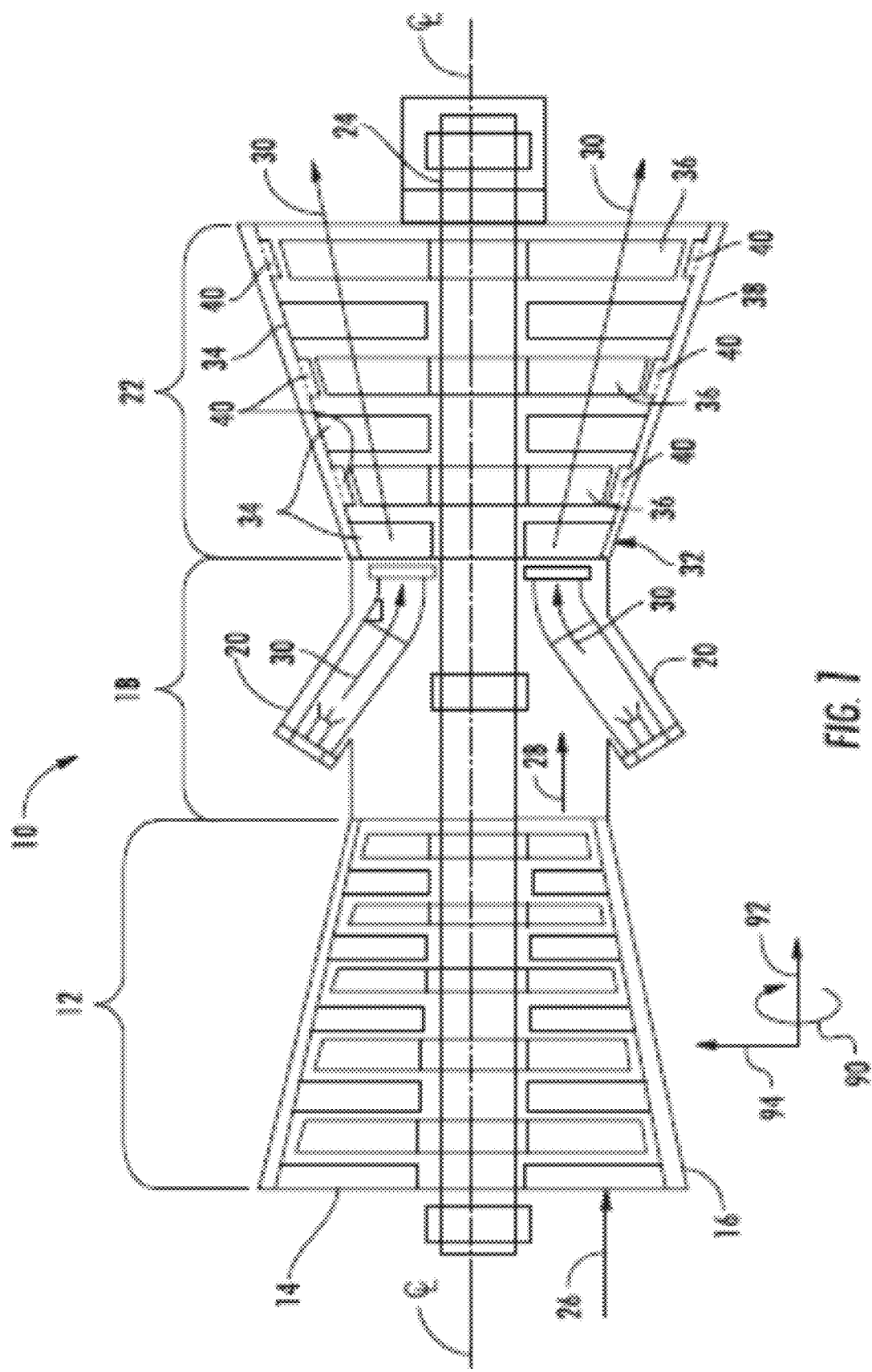
FIG. 1 is a schematic of a typical gas turbine as may incorporate embodiments of the present specification.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" or "aft", and "downstream" or "forward" refer to the relative direction with respect to fluid flow in a fluid pathway. For example, "upstream" or "aft" refers to the direction from which the fluid flows, sometimes referred to as 'rear'. "Downstream" or "forward" refers to the direction to which the fluid flows, sometimes referred to as 'front'. The term "radially" refers to the relative direction that is substantially perpendicular to an axial centerline of a particular component, and the term "axially" refers to the relative direction that is substantially parallel to an axial centerline of a particular component. The terms "circumferential" and "tangential" may refer to the direction aligned with the circumference of a rotating turbine or compressor rotor.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a gas turbine for purposes of illustration, one of ordinary skill in the art will readily appreciate that embodiments of the present invention may be applied to any turbomachine and is not limited to an industrial gas turbine unless specifically recited in the claims. Although an industrial, marine, or land based gas turbine is shown and described herein, the present disclosure as shown and described herein is not limited to a land based and/or industrial, and/or marine gas turbine unless otherwise specified in the claims. For example, the disclosure as described herein may be used in any type of turbine including but not limited to an aero-derivative turbine or marine gas turbine as well as an aero engine turbine, and/or aircraft engines.

Cooled structures herein are defined as any structure requiring direct contact with a forced cooling air source to preserve the integrity of the structure. These structures can include portions of turbine shrouds, nozzles, blades, and any other hot gas path component of the turbine.

Referring now to the drawings, wherein like numerals refer to like components, FIG. 1 illustrates an example of a gas turbine 10 which may incorporate various embodiments of the present invention. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. The rotor shaft 24 rotates about an engine centerline CL. A turbine casing 38 at least partially encases the rotor blades 36 and the turbine nozzles 34. Each or some of the rows of rotor blades 36 may be concentrically surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition, or in the alternative, the shaft 24 may be used to drive the compressor section 12 of the gas turbine.

Figure 2:
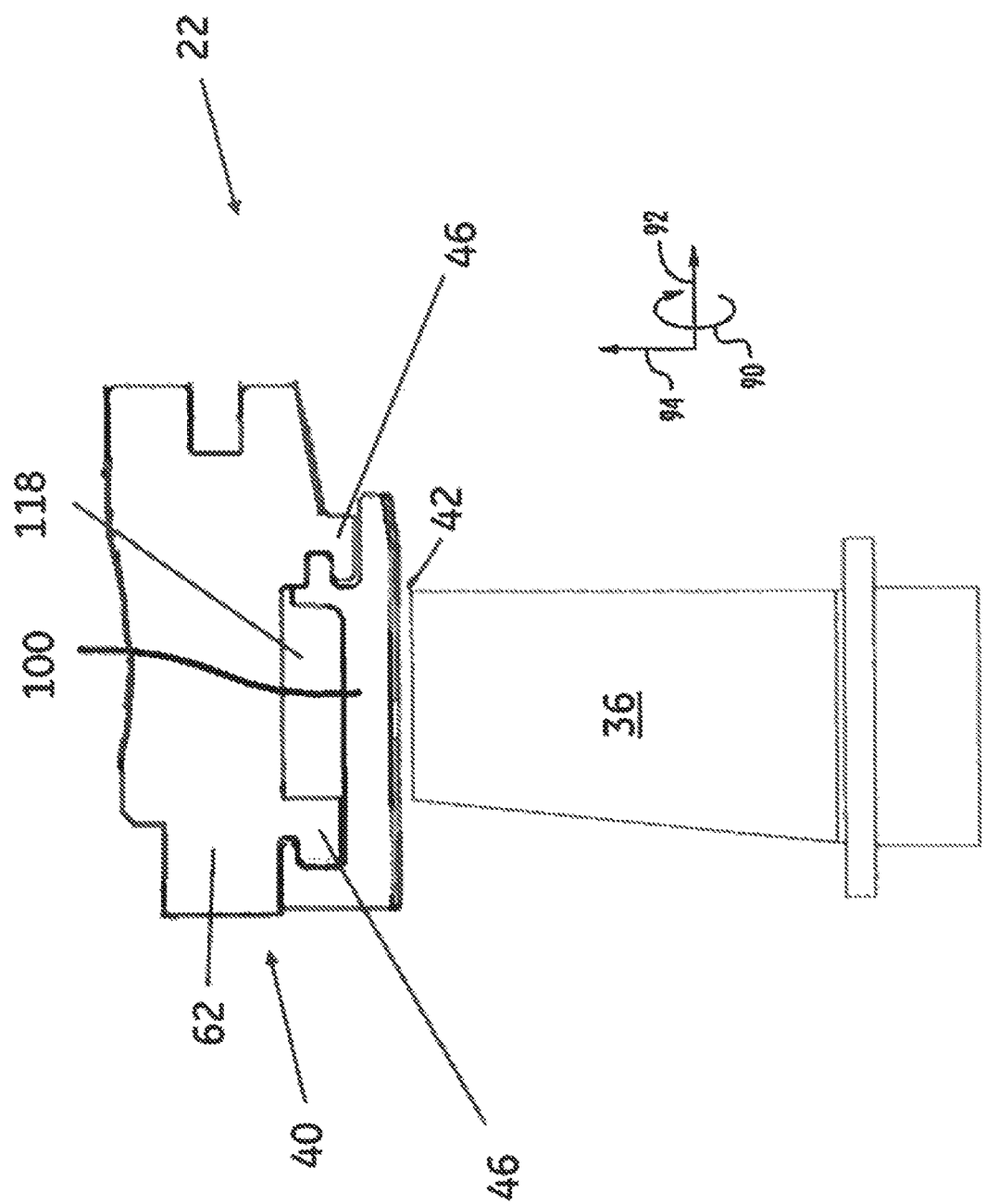
FIG. 2 is an enlarged cross section side view of a portion of the turbine section including an exemplary rotor blade and a portion of a stage two shroud block assembly according to various embodiments of the present disclosure.

FIG. 2 provides an enlarged cross section side view of a portion of the turbine section 22 including an exemplary rotor blade 36 and a portion of a stage two shroud block assembly 40 according to various embodiments of the present disclosure. As shown in FIG. 2, the shroud block assembly 40 generally extends in a radial direction 94 between the turbine casing 38 (not shown) and a tip portion 42 of the rotor blade 36. The shroud block assembly 40 generally includes mounting hardware 46 for securing the shroud block assembly 40 to the plurality of shroud block segments 100 that are arranged circumferentially 90 in an annular array around the rotor blades 36 within the turbine casing 38 (not shown).

Figure 3:
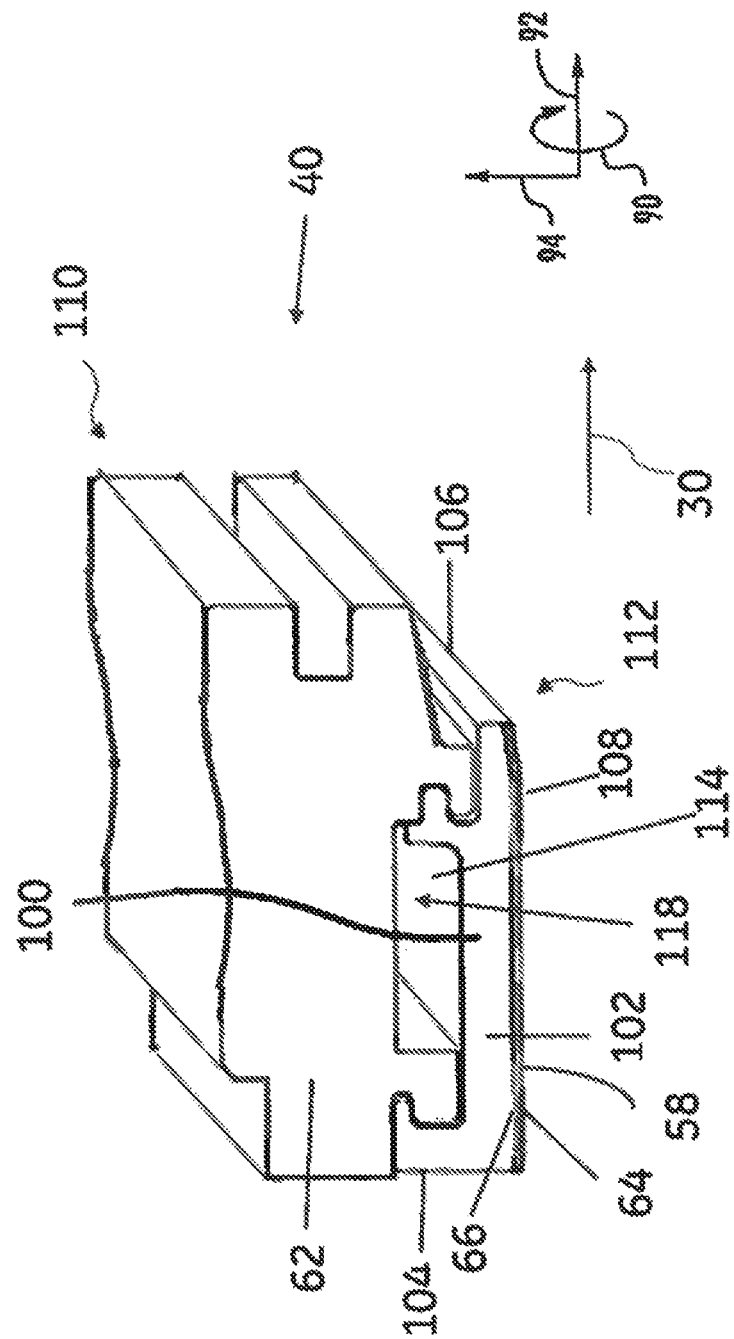
FIG. 3 is a perspective view of an embodiment of an inner turbine shroud segment coupled to an outer turbine shroud segment to form a turbine shroud block assembly, typical for stage one of a gas turbine.

FIG. 3 is a perspective view of an embodiment of a shroud block segment 100 coupled to a shroud hanger 62 to form a turbine shroud block assembly 40, which may be used with a first gas turbine rotating stage (i.e., a stage one rotor). The turbine 10 includes multiple turbine shroud block assemblies 40 that together form a ring about respective turbine stages. In certain embodiments, the turbine 10 may include multiple shroud block segments 100 coupled to respective shroud hanger 62 for each turbine shroud segment 40 disposed in the circumferential direction 90 about a rotational axis of the turbine 10. In other embodiments, the turbine 10 may include multiple shroud block segments 100 coupled to the shroud hanger 62 to form the turbine block assembly 40. In some embodiments, a pre-sintered preform (PSP) layer 58 may be disposed on (e.g., brazed onto) the combustion gas side 112 so that a first PSP surface 64 of the PSP layer 58 together with the main body 102 defines (e.g., covers) the channels and a second PSP surface 66 of the PSP layer 58 interfaces with the hot gas flow path 30. The PSP layer 58 may be formed of superalloys, brazing materials, or mixtures thereof. In certain embodiments, as an alternative to the PSP layer 58, a non-PSP metal sheet may be disposed on the combustion gas side 112 that together with the main body 102 defines the channels. In some embodiments, as an alternative to the PSP layer 58, a barrier coating or thermal barrier coating may be utilized to enclose the channels within the main body 102.

As depicted, the shroud block segment 100 includes a main body 102 having an upstream or leading edge 104 and a downstream or trailing edge 106 that both interface with a hot gas flow path 30. The main body 102 also includes a first side portion 108 (e.g., first slash face) and a second side portion 110 (e.g., second slash face) disposed essentially perpendicular to the leading edge 104 and the trailing edge 106. The main body 102 further includes a pair of opposed sides, the combustion gas side 112 and the back side 114 extending between the leading and trailing edges 104, 106 and the first and second side portions 108, 110. Each of the combustion gas sides 112 of the main body 102 defines the boundary or periphery of the hot gas flow path 30. In certain embodiments, the main body 102 (particularly, opposing sides 112, 114) may be arcuate shaped in the circumferential direction 90 between the first and second side portions 108, 110 and/or in the axial direction 92 between the leading and trailing edges 104, 106. The back side 114 is configured to interface with a cavity 118 defined between the shroud block segment 100 and the shroud hanger 62.

Figure 4:
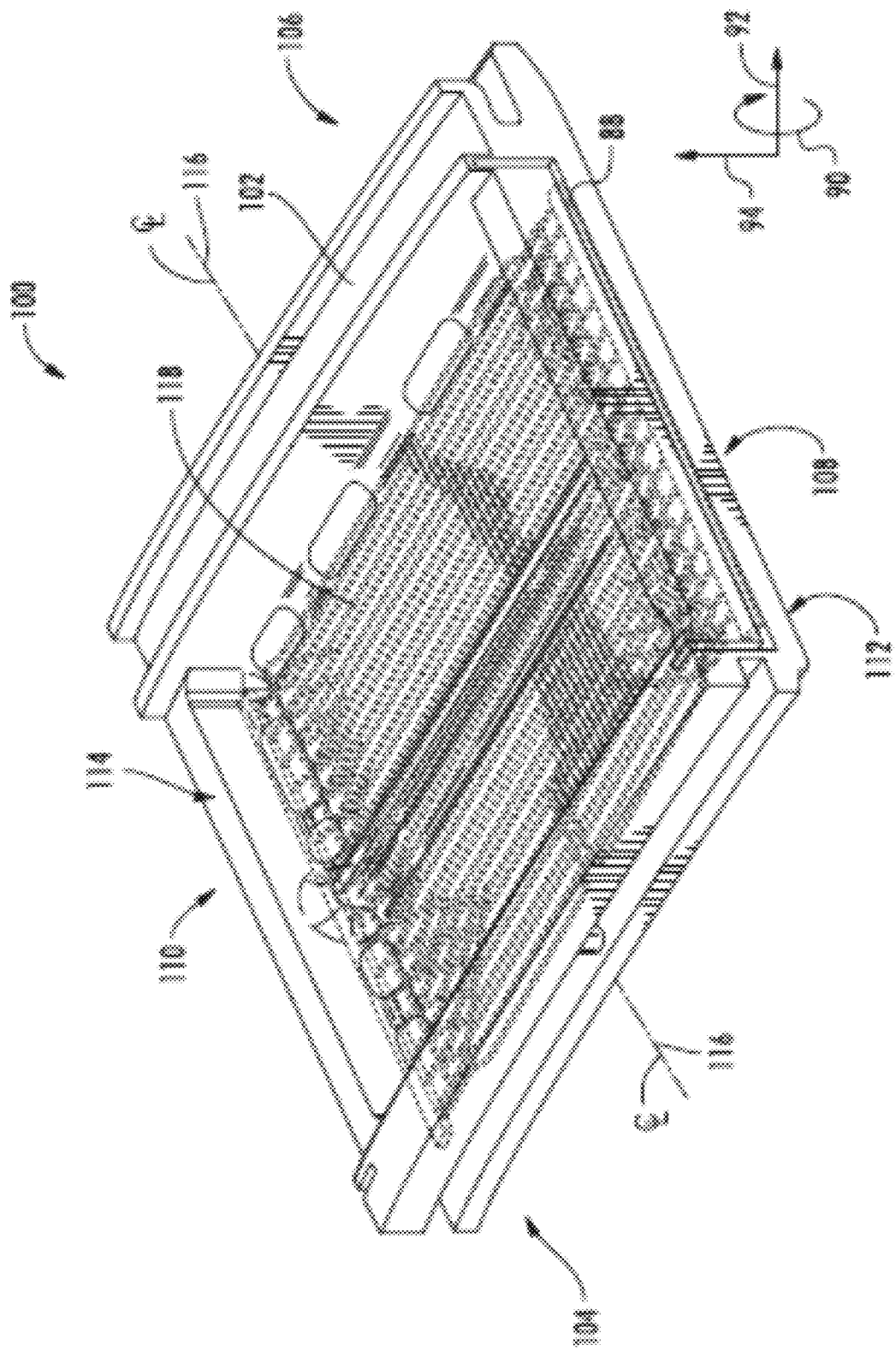
FIG. 4 is a perspective view of an inner turbine shroud segment having micro-channels according to various embodiments of the present disclosure.
Figure 5:
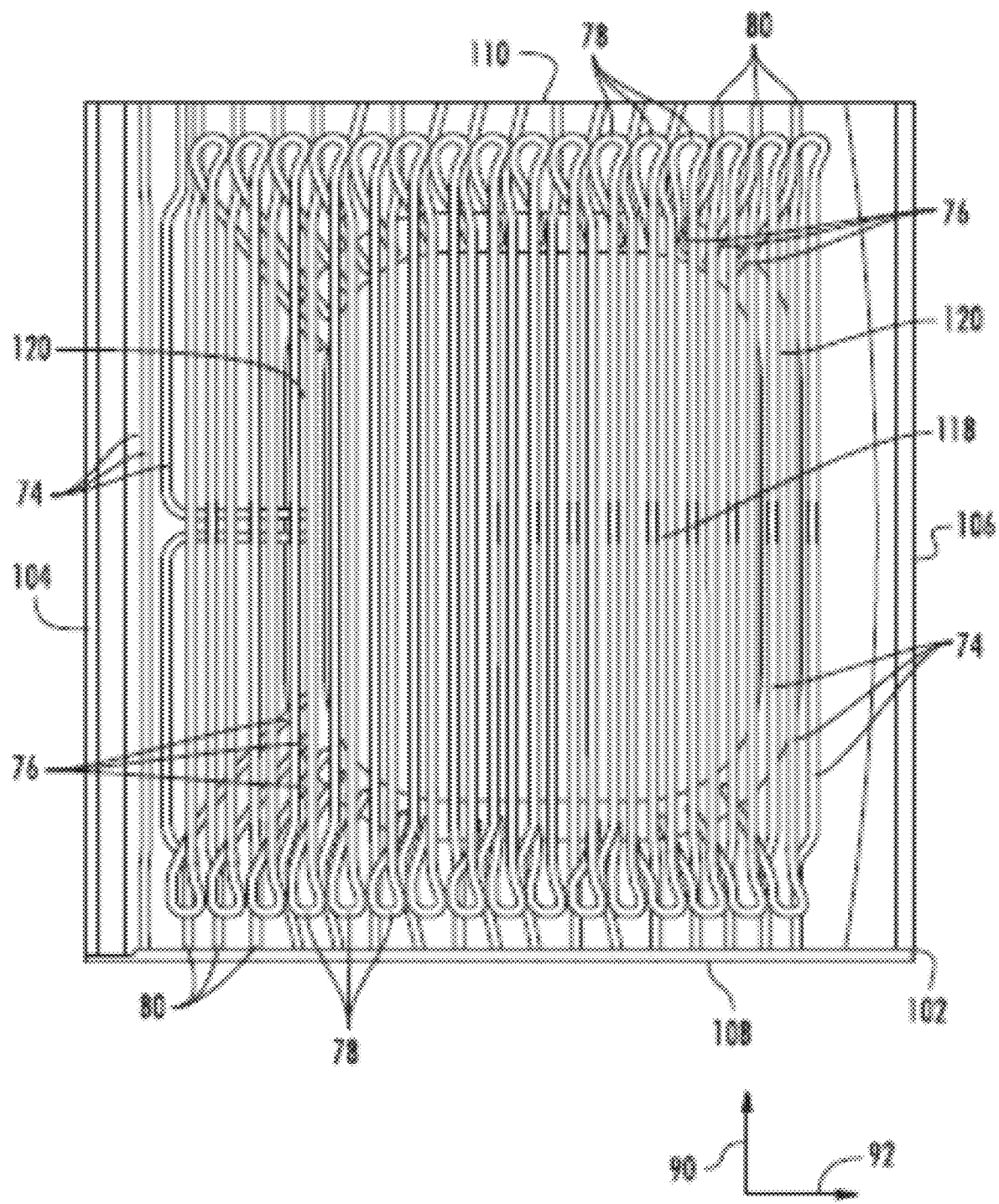
FIG. 5 is a bottom view of an embodiment of an inner turbine shroud segment micro-channels without a pre-sintered preform (PSP) layer.

As seen in FIG. 4 and FIG. 5, the main body 102 may include multiple cooling air micro-channels 74 (e.g., cooling channels or micro-channels) disposed within the combustion gas side 112 to help cool the hot gas flow path components (e.g., turbine shroud 40, shroud block segment 100, etc.). In certain embodiments, some of these channels are disposed adjacent the trailing edge 106 or leading edge 104 with or without other channels disposed within the first and second side portions 108, 110 of the main body 102.

In some embodiments, the cooled structures and micro-channels may be cast entirely, cut with liquid-jet guided laser technology (sometimes referred to as Liquid MicroJet), '3D-printed' with additive manufacturing processes, or precision machined within the main body 102 near the combustion gas side 112. Additive manufacturing build methods can include any form of binder jetting, directed energy deposition, material extrusion, selective laser melting, material jetting, powder bed fusion, sheet lamination, and vat photopolymerization. More specifically, direct metal laser melting (DMLM), direct metal laser sintering (DMLS), and electron beam melting (EBM) can be used to manufacture the cooled structures and micro-channels.

An exemplary embodiment, shown in FIGS. 4 and 5, has a main body 102 that includes curved portions 78 positioned adjacent each other. The shroud block segment 100 is generally proximate to a cooling medium or air (i.e., cooler than the temperature in the hot gas flow path 30 combustion gas side 112) in the turbine 10 from the compressor 12. The shroud block segment 100 includes an intake end 76 to receive the cooling fluid or air from the compressor 24 that provides the cooling fluid to the cavity 118. The cooling medium flows to the cooling channels 74 within the main body 102 of the shroud block segment 100 via intake ends 76 disposed within the main body 102 extending from the back side 114 to the cooling channels 74.

Each cooling channel 74 includes a curved portion 78 having the intake end 76 and an exhaust end 82. The exhaust end 82 may include a metering feature (e.g., a portion of the main body 102 extending into the channel that narrows a cross-sectional area of a portion of the channel relative to an adjacent cross-sectional area of the channel) to regulate flow of the cooling fluid within the cooling channel 74. In certain embodiments, each cooling channel 74 itself (excluding the exhaust end portion) acts as a metering feature (e.g., includes a portion of the main body 102 extending into the channel). In other embodiments, the intake end 76 coupled to the curved portion 78 may include a metering feature (e.g., portion of the main body 102 extending into the intake end 76). In certain embodiments, the cooling channel 74 itself, the exhaust end 82, or the intake end 76, or a combination thereof includes a metering feature. In addition, the cooling fluid exits the cooling channels 74 (and the main body 102) via the exhaust end 82 at the first side portion 108 and/or the second side portion 110. In certain embodiments, the channels may be arranged in an alternating pattern with a first set of channels having the intake end 76 disposed adjacent the first side portion 108 and the second set of channels disposed adjacent the second side portion 110, with adjacent channels having opposite orientation.

The curved portions 78 of the cooling channels 74 provide a larger cooling region (e.g., larger than typical cooling systems for turbine shrouds) by increasing a length of cooling channel 74 adjacent the slash faces 108, 110 while reducing cooling air flow. In each set of channels, the curved portions 78 are positioned adjacent each other and may incorporate exhaust ends 82 that are interwoven or overlapping from the opposing side cooling channel 74. The curved portions 78 extend around or over the opposing exhaust ends 82, which are configured to exhaust cooling air from a plurality of exhaust ports 80 positioned generally radially outward from the curved portions 78. The interwoven exhaust ends 82 can extend in most any direction around the curved portions 78, such as radially outward, axially forward, axially aft, and mixtures thereof. In certain embodiments, the main body 102 includes channels disposed adjacent the trailing edge 106 and leading edge 104 that are shaped different from the channels disposed on the rest of the main body 102. For example, the channels adjacent the trailing edge 106 or leading edge 104 may each include a serpentine pattern. The shape of the cooling channels 74 is also enhanced to provide adequate cooling in the event of plugged channels. The disclosed embodiments of the inner turbine shroud segment may enable cooling of the shroud block segment 100 with less air (e.g., than typical cooling systems for turbine shrouds) resulting in reduced costs associated with chargeable air utilized in cooling.

FIG. 4 provides a perspective view of an example shroud block segment 100 having cooling channels 74 according to various embodiments. As shown in FIG. 4, the shroud block segment 100 includes a main body 102 having a leading portion 104, a trailing portion 106, a first side portion 108 and an opposing second side portion 110. The first and the second side portions 108, 110 extend axially between the leading portion 104 and the trailing portion 106. The main body 102 further includes a combustion gas side 112 that is radially separated from an opposing back side 114. The combustion gas side 112 has a generally arcuate or circumferential shape with respect to an axial centerline 116, CL, of the shroud block segment 100. The combustion gas side 112 may be coated with a heat resistant coating such as a thermal barrier coating or the like. A cooling pocket or cavity 118 is defined in the back side 114. The cavity 118 is at least partially defined between the leading portion 104, the trailing portion 106, the first side portion 108 and the opposing second side portion 110. The cavity 118 is positioned radially outward from the combustion gas side 112 and further defines an angled perimeter wall 120. The angled perimeter wall 120 can be disposed at any suitable angle as measured from the radial direction 94, from about 0 degrees to about 90 degrees, to enable distribution of cooling air around the cavity 118 at the intake ends 76 of the cooling channels 74 (or micro-channels).

FIG. 5 is a bottom view of an embodiment of cooling air micro-channels 74 positioned in a shroud block segment 100 without the PSP layer 58. As depicted, the main body 102 includes a plurality of cooling channels 74 (e.g., cooling channels or micro-channels) disposed within the combustion gas side 112. The main body 102 may include 2 to 40 or more cooling channels 74. Each cooling channel 74 is configured to receive a cooling fluid from the cavity 118. Each cooling channel 74 includes an intake end portion 76 that includes a curved portion 78 positioned adjacent each other. Each curved portion 78 has a turn radius 84 ranging from between approximately 0.05 to approximately 13 millimeters (mm), approximately 0.1 to approximately 10 mm, approximately 1.14 to approximately 7 mm, and all subranges therebetween. The intake end 76 of each curved portion 78 is fluidly coupled to the cavity 118 to receive the cooling fluid from the cavity 118. The curvature of the curved portion 78 and interwoven and/or overlapping (described hereinafter) radially displaced exhaust ends 82 enables cooling channels 74 and curved portions 78 to be positioned adjacent and radially overlapping each other within the first and second side portions 108, 110. In addition, the curved portion 78 provides a larger cooling region by increasing a length of cooling channel 74 adjacent the side portions 108, 110 while reducing cooling flow. The curved portion 78 and interwoven and/or overlapping (described hereinafter) radially displaced exhaust ends 82 enables better spacing of the straight portions of the cooling channels 74. Further, the loop shape of the curved portion 78 and interwoven radially displaced exhaust ends 82 enables the straight portions of the cooling channels 74 to be uniformly distant from an adjacent cooling channel 74 to avoid thermal gradients and uniformly cool the main portion of the main body 102 of the shroud segment 40.

In certain embodiments, the curved portion 78 could be adjusted to enable the spacing of the straight portions of the cooling channels 74 to be more tightly packed to accommodate higher heat load zones. Overall, the shape of the cooling channels 74 is also enhanced to provide adequate cooling in the event of plugged cooling channels 74. In certain embodiments, the exhaust ends 82 include a metering feature configured to regulate (e.g., meter) a flow of the cooling fluid within the respective cooling channel 74. In certain embodiments, each cooling channel 74 may form a segmented channel at the exhaust end 82. In certain embodiments, each cooling channel 74 itself, excluding the exhaust end 82, acts as a metering feature. In other embodiments, intake ends 76 coupled to the curved portion 78 may include a metering feature (e.g., portion of the main body 102 extending into the intake end 76). In certain embodiments, the cooling channel 74 itself, the exhaust end 82, or the intake end 76, or a combination thereof includes a metering feature.

Figure 6:
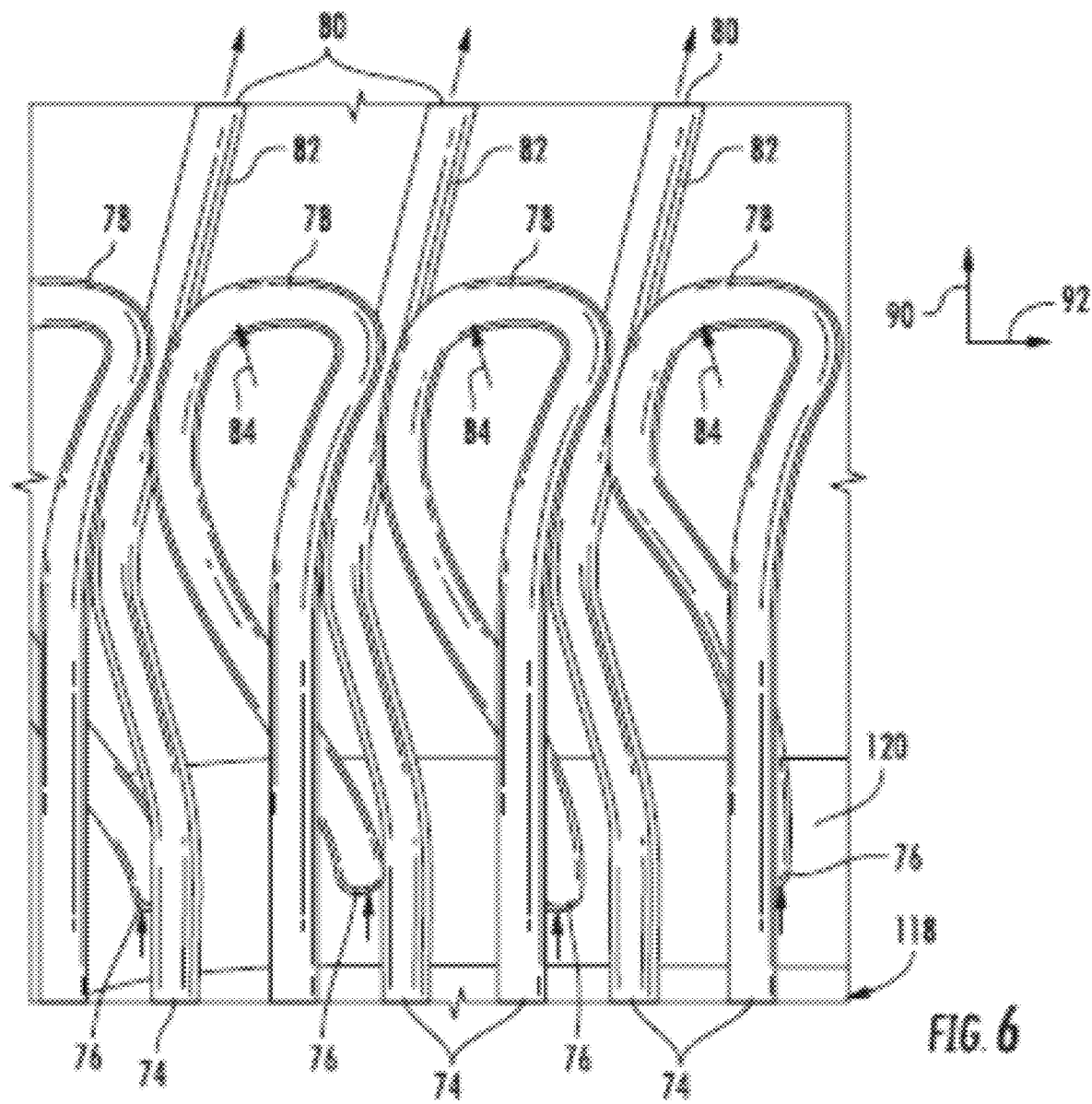
FIG. 6 is an enlarged bottom view showing exhaust ends interwoven with curved portions of the micro-channels.

FIG. 6 is an enlarged bottom view (i.e., radially outward-looking) showing opposing exhaust ends 82 routed through a first side portion 108 and interwoven with curved portions 78 of the cooling channels 74. The interwoven geometry of the exhaust ends 82 with the curved portions 78 is shown, as well as the intake end 76 connection to the angled perimeter wall 120 at a different elevation. Each cooling channel 74 also includes an exhaust end 82 that enables the cooling fluid to exit the main body 102 via the side portions 108, 110 through exhaust ports 80, as indicated by the arrows.

Figure 7:
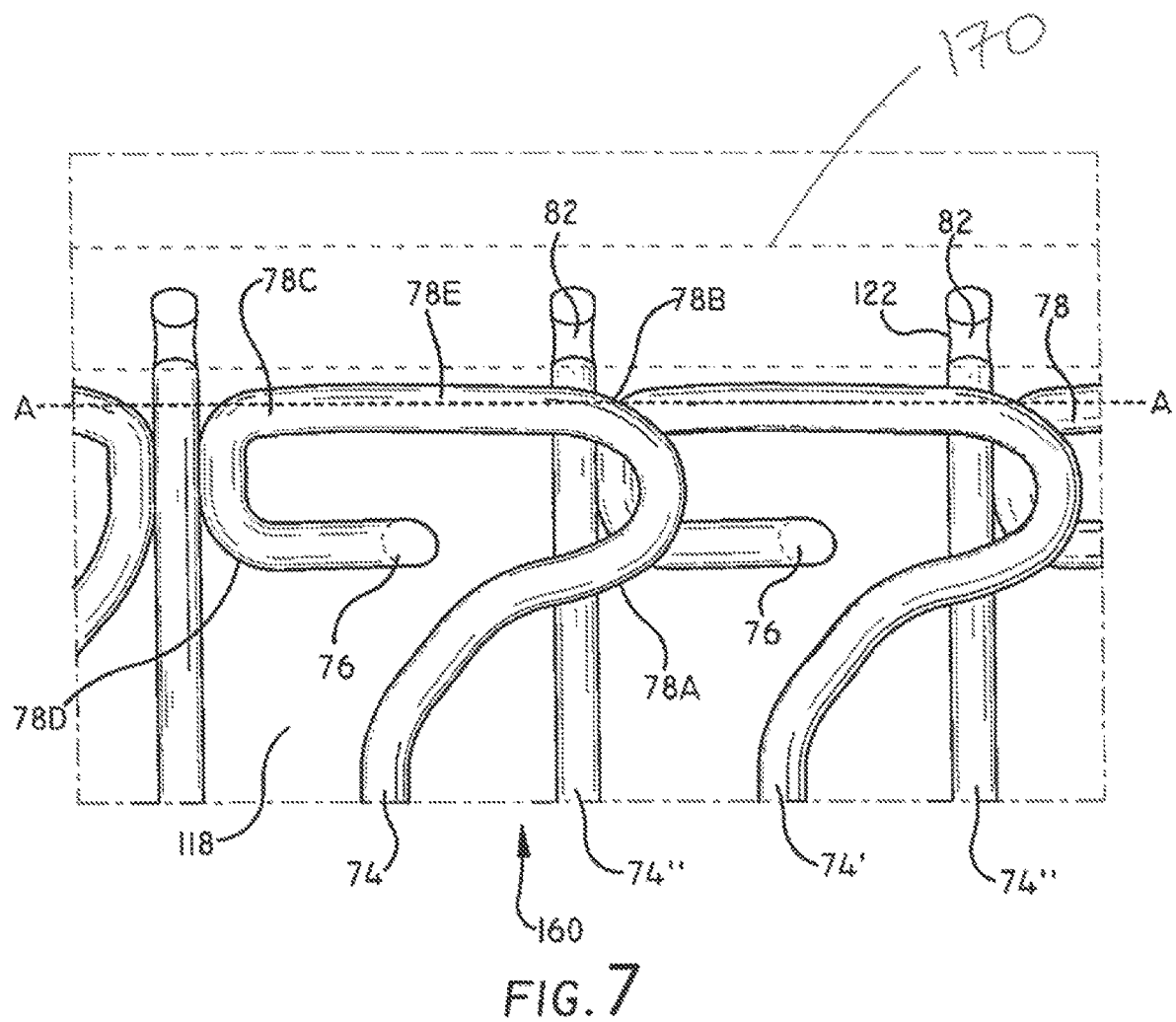
FIG. 7 is an enlarged bottom view of a first slash face showing exhaust ends extending generally radially outward from a combustion gas side surface to overlapping with curved portions.

FIG. 7 is an enlarged bottom view showing overlapping features of the present embodiments. The embodiment of FIG. 6 illustrates non-overlapping curved portions 78 while the embodiment of FIG. 7 illustrates overlapping cooling channels 74. As illustrated in FIG. 7, the exhaust end 82 of the cooling channel 74 is generally behind or radially outward of the intake end 76. The curved portion 78 of the cooling channel 74 includes a first curved portion 78A which completely overlaps the exhaust end 82 of an oppositely disposed cooling channel 74. In contrast, in the non-overlapping embodiment of FIG. 6, the curved portion 78 partially overlaps radially with the exhaust end 82 of an oppositely disposed cooling channel 74, and does not overlap radially with the adjacent cooling channel 74. The exhaust ends 82 are exits of the cooling channels 74 and are straight or linear. As the first curved portion 78A bends through an angle of between about 130 degrees and about 190 degrees, it transitions to a second curved portion 78B. The second curved portion 78B overlaps with (and is radially inward of) both the exhaust end 82 of an oppositely disposed cooling channel 74 and a third curved portion 78C of an adjacent cooling channel 74. The third curved portion 78C turns about 80 to about 100 degrees as it transitions to a fourth curved portion 78D, which in turn transitions to the intake end 76 of the cooling channel 74. Each exhaust end 82 may include a metering feature 122 for regulating flow through each cooling channel 74. The raised or radially outward exhaust ends 82 allow space to create overlapping sections.

Referring still to FIG. 7, cooling air enters the cooling channel 74 at the intake end 76, which is open to the cavity 118, located radially outward of the cooling channel 74. Air flows through the cooling channel 74 which turns at the fourth curved portion 78D, and again at the third curved portion 78C. Between the third curved portion 78C and the second curved portion 78B, the air flows through cooling channel 74 in a radially inward direction while flowing through a fifth curved portion 78E. Proximate the second curved portion 78B, the cooling channel 74 overlaps with the straight exhaust end 82 of an oppositely disposed cooling channel 74" such that the second curved portion 78B is radially inward of the exhaust end 82 of the oppositely disposed cooling channel 74". The cooling channel 74 turns at the first curved portion 78A. Proximate both the first curved portion 78A and the second curved portion 78B (including the portions of the cooling channel 74 between the first curved portion 78A and the second curved portion 78B), the cooling channel 74 overlaps with an adjacent cooling channel 74' such that the first curved portion 78A and the second curved portion 78B are radially inward of the third curved portion 78C and fourth curved portion 78D of the adjacent cooling channel 74'. After passing through the first curved portion 78A, air travels the length of the cooling channel 74 and eventually exits the cooling channel 74 through the exhaust end 82 located at the opposite end of the shroud block segment 100 from where it entered via intake end 76. The second curved portion 78B, the third curved portion 78C, and the fifth curved portion 78E collectively form a channel side portion that is adjacent the circumferential edge 170 (or slash face) of the shroud block segment 100.

Figure 8:
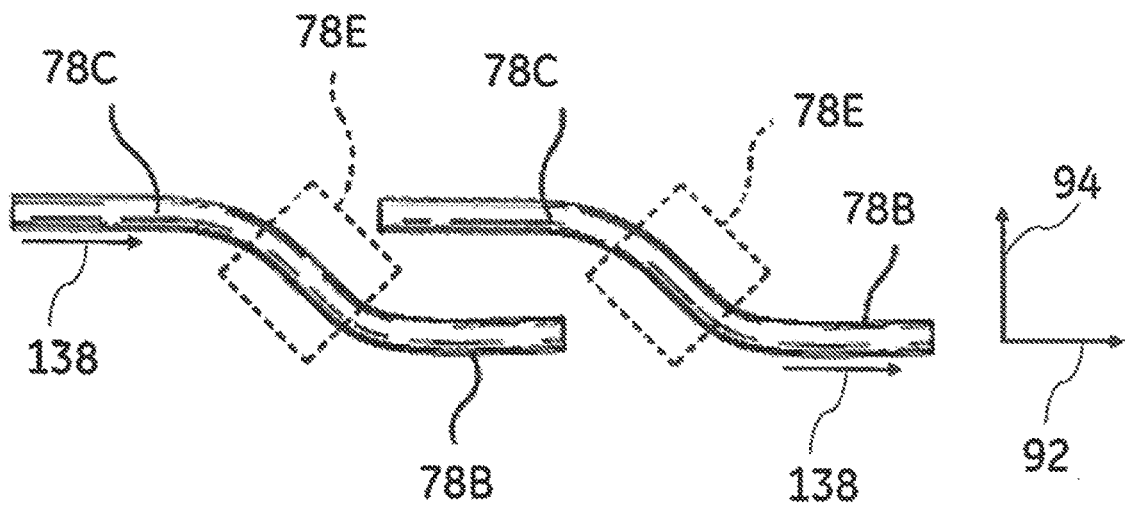
FIG. 8 is an enlarged side view showing overlapping features.

FIG. 8 shows a side or circumferentially-looking view of the overlapping cooling channel embodiment from FIG. 7. The second curved portion 78B of the cooling channel 74 transitions to the third curved portion 78C via the fifth curved portion 78E. The fifth curved portion 78E of the cooling channel 74 carries the cooling channel in a radially inward direction as it transitions from the third curved portion 78C to the second curved portion 78B. Radially outward direction 94 is illustrated in FIG. 8. As such, the third curved portion 78C is at a radially outward position compared with the second curved portion 78B. The arrangement of FIGS. 7 and 8 allows the second curved portion 78B of each cooling channel 74 to overlap with and be radially inward of the third curved portion 78C of the adjacent cooling channel 74. Stated otherwise, the second curved portion 78B is closer to the surface of the shroud block segment 100 that is exposed to combustion gases (combustion gas side 112). The fifth curved portion 78E acts as a transition portion angled toward the substrate radially inner surface or combustion gas side 112 from the point of view of cooling air flowing in the direction 138 it would normally flow in operation. In other embodiments, the fifth curved portion 78E angles away from the substrate radially inner surface depending on the cooling channel 74 configuration and frame of reference. For example, in other embodiments, from the point of view of a direction 138 in which cooling air travels within the cooling channel 74, the transition portion 78E angles in a radially outward direction 94 toward shroud back side 114 (not shown).

Figure 9:
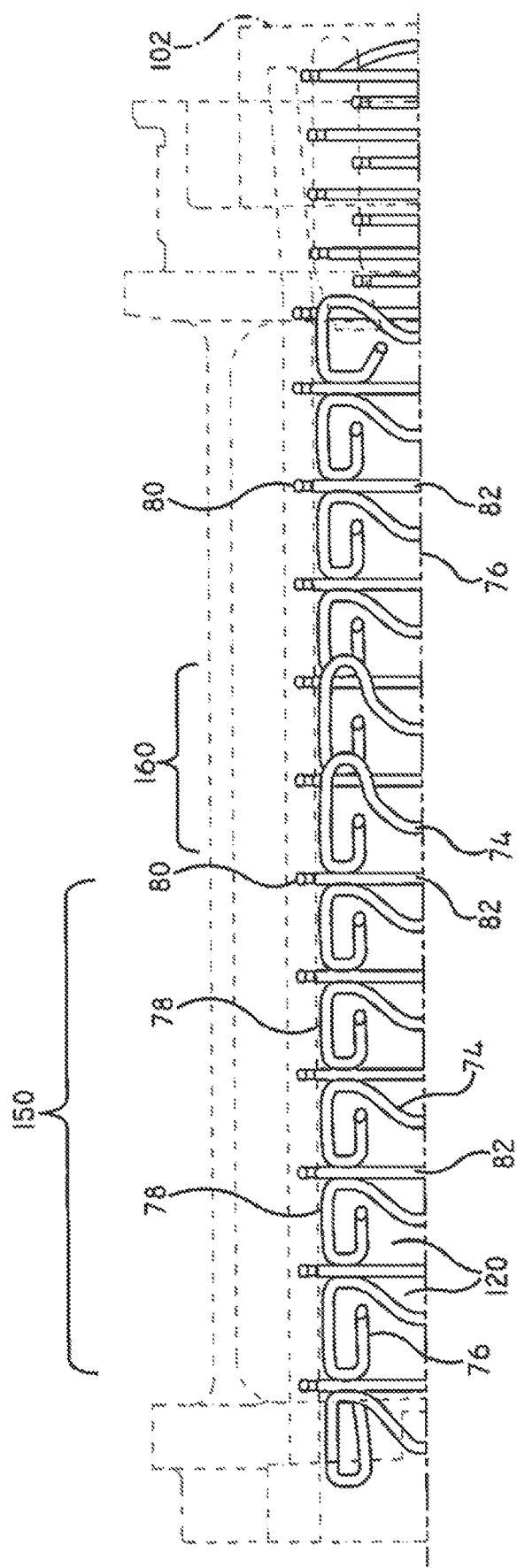
FIG. 9 is a bottom view illustrating overlapping and non-overlapping features.

FIG. 9 is a bottom or radially outward looking view showing a first plurality of cooling channels 150 in a non-overlapping arrangement and a second plurality of cooling channels 160 in an overlapping arrangement. Embodiments of the present invention may use either the overlapping or the non-overlapping arrangement. Arrangements of the present embodiments that use both the overlapping or the non-overlapping arrangements as shown in FIG. 9 are also possible. Other embodiments may also include U-shaped, L-shaped and J-shaped cooling channels 74, (when viewed from the radially inner gas path side) and combinations thereof, with the cooling channels 74 angling radially inward from toward the combustion gas side 112.

Figure 10:
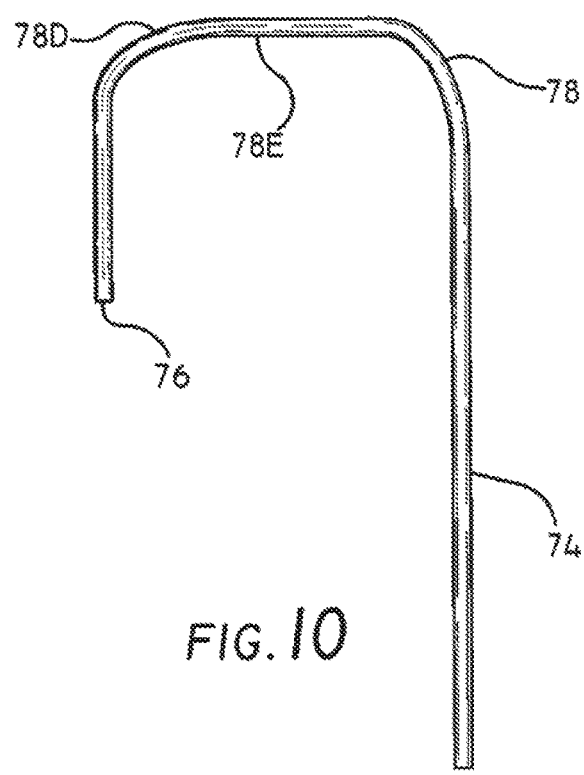
FIG. 10 is an enlarged bottom view showing an J-shaped cooling channel.

FIG. 10 is a bottom or radially outward looking view showing a J-shaped embodiment of a cooling channel 74 that can be used in an overlapping configuration. Whereas the embodiments of FIGS. 7, 8 and 9 are hook-shaped, the embodiment of FIG. 10 is J-shaped. FIG. 10 illustrates a cooling channel 74 including a curved portion 78. The curved portion 78 may be substantially right angled, or between about 85 and about 95 degrees in the J-shaped embodiment. In other arrangements the curved portion 78 may be from about 75 degrees to about 105 degrees or from about 60 degrees to about 120 degrees in the J-shaped embodiment. The J-shaped cooling channel 74 of FIG. 10 includes a fifth curved portion 78E where the cooling channel 74 angles radially outward away from a substrate surface as the cooling channel transitions in the direction of the cooling channel inlet 76. Stated otherwise, from the perspective of cooling air entering at channel inlet 76 and flowing through the channel 74, the fifth curved portion 78E angles radially inward toward the substrate surface (i.e., combustion gas side 112 of the shroud block segment 100). The portions of the cooling channel 74 proximate the intake end 76 correspond positions that are radially outward of the portions that are downstream of the fifth curved portion 78E, noting that the transition in the cooling channel 74 between radially inner and radially outer locations occurs at the fifth curved portion 78E. In the radially inner location, the cooling channel 74 is closer to the combustion gas side 112 of the shroud block segment 100. In the radially outer location, the cooling channel 74 is closer to the cavity 118 (FIGS. 2-5). The fifth curved portion 78E transitions to fourth curved portion 78D where the cooling channel turns about 90 degrees (from about 60 degrees to about 120 degrees, or, in another embodiment, form about 75 degrees to about 105 degrees). The fourth curved portion 78D transitions to the cooling channel inlet 76, where air enters the cooling channel 74 from cavity 118 (not shown).

Figure 11:
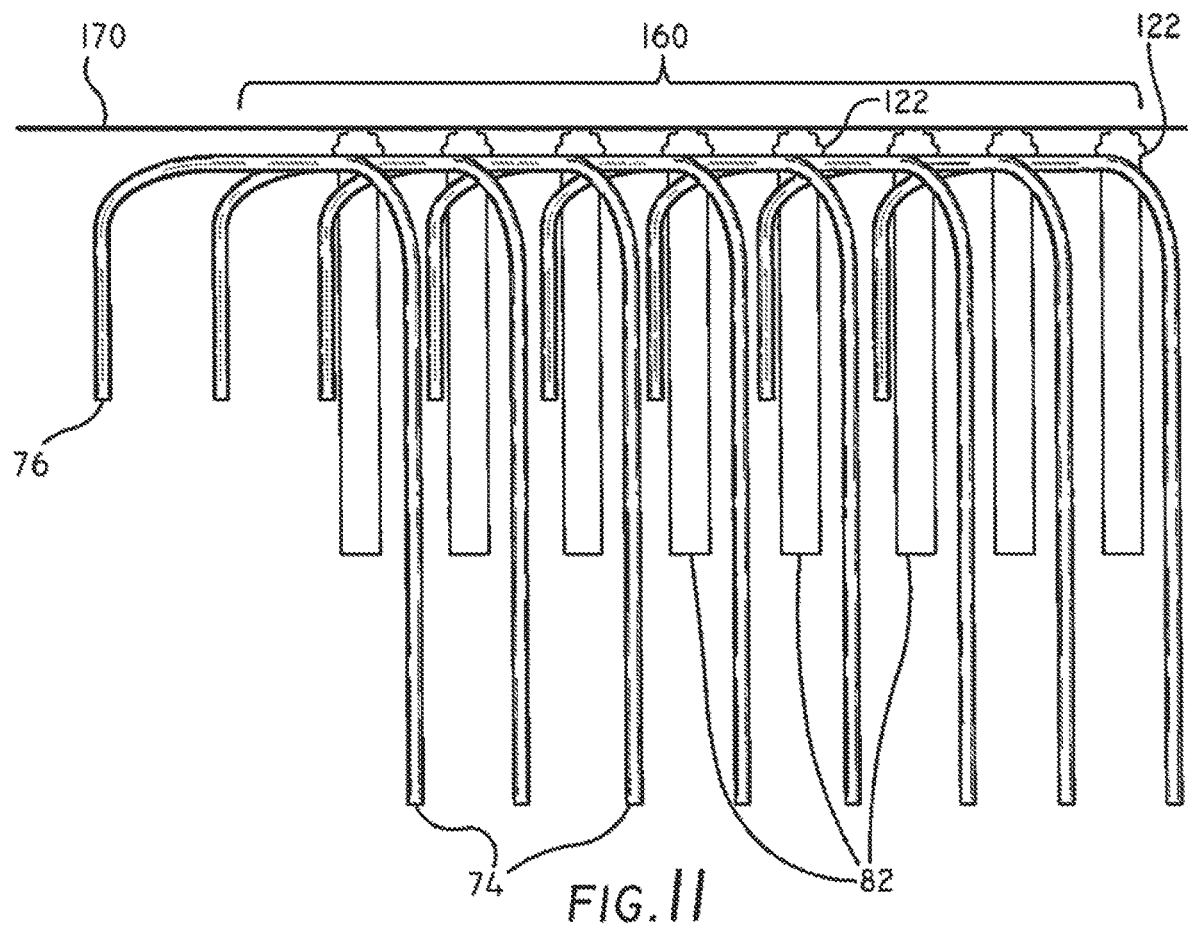
FIG. 11 is an enlarged bottom view showing overlapping J-shaped cooling channels.

FIG. 11 is a bottom or radially outward looking view showing a plurality 160 of cooling channels 74 with a J-shaped overlapping configuration. The feed portion comes in from above (radially outward) giving the channel adjacent the gas path a J-shape. Channels could similarly have a U-shape or L-shape. The feed portion may be offset or angled as needed to avoid the overlapping section of the adjacent cooling channel 74. The curved portion 78 of each cooling channel 74 radially overlaps with the intake end 76 and fourth curved portion 78D of one or more adjacent cooling channels 74 such that the curved portion 78 is both radially inward of the cooling channel inlet 76 as well as closer to the combustion gas side 112 of the shroud block segment 100. The curved portion 78 of each cooling channel 74 also radially overlaps with the exhaust ends 82 of oppositely disposed cooling channels 74 such that each curved portion 78 is again radially inward and closer to the combustion gas side 112 than the exhaust ends 82. This arrangement allows the plurality of cooling channels 160 to deliver continuous cooling flow to the radially inward portion of the shroud block segment 100 proximate both the combustion gas side 112 and a slash face or circumferential edge 170 of the shroud block segment 100. Similar arrangements (J-shaped, U-shaped and hook-shaped, as well as L-shaped cooling channels that have inlets 76 oriented at about 90 degrees from the longest portion of the cooling channels 74 and any other orientation utilized by the cooling channel 74 to cross the surface adjacent to the gas path) may be used in embodiments other than shroud cooling where a surface or substrate is exposed to hot gases and/or temperatures and requires cooling proximate to both the substrate surface and an edge of the substrate or surface. Each exhaust end 82 may include a metering feature 122 for regulating flow through each cooling channel 74, as illustrated in FIG. 11.

In operation, the overlapping arrangement 160 shown in FIGS. 7, 8, 9, 10 and 11 allow the cooling channels 74 to cover an increased portion of the substrate (combustion gas side 112) closest the slash face or circumferential edge 170 of the component, while simultaneously covering the radially inward location closest to the surface of the component where cooling flow is desired. Embodiments that do not use the overlapping arrangement 160 will have an axial gap between the portion of the cooling channel 74 proximate the slash face or circumferential edge 170 and the portion of an adjacent cooling channel 74 proximate the slash face or circumferential edge 170. The axial gap could lead to hot spots in the combustion gas side 112 the shroud block segment 100 and/or excessive temperature gradients. In other embodiments, overlapping cooling channels 74 may be used to cool any substrate or surface exposed to hot temperatures where under-surface cooling features are employed and where providing sufficient cooling around the periphery or edges of the substrate presents challenges. The embodiments described herein deliver cooling air closest to the combustion gas side 112 of the shroud block segment 100 using the portion of the cooling channels 74 at the inlet 76 where cooling air will be coolest. Similarly, the cooling channel exits 82 in the embodiments described herein (which dispense hotter or "spent" cooling air) are further away from the combustion gas side 112, thereby allowing the curved portions 78 near the inlets 76 to be closer to the combustion gas side 112.

In some embodiments, the shroud block assembly 40 can be considered a cooled structure as disclosed herein. The cooling channels 74 can form a flow passage parallel to a combustion gas side 112. Each cooling channel 74 can have an intake end 76 positioned around the angled perimeter wall 120 of the cavity 118, or any other position on the shroud block assembly 40 exposed to the cooling air, such that the intake end 76 is configured to accept compressed cooling air from a cooling flow path.

In some embodiments of the cooled structure, intake ends 76 radially overlap with the curved portions 78. These embodiments may include either hook-shaped cooling channels 74 or J-shaped cooling channels 74, or both. In other embodiments, the extent to which both the hook-shaped cooling channels 74 and J-shaped cooling channels 74 overlap with adjacent cooling channels may vary such that an overlap in the axial distance of one cooling channel 74 is greater or less than the same for at least one other cooling channel 74. Similarly, in other embodiments, the curvature radii and angling of the cooling channels 74 may vary from one cooling channel 74 to the next.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine shroud block segment comprising:
a leading edge;
a trailing edge, the trailing edge being opposite the leading edge;
a first side portion, the first side portion being substantially orthogonal to each of the leading edge and the trailing edge;
a second side portion, the second side portion being opposite the first side portion and substantially orthogonal to each of the leading edge and the trailing edge;
a substrate surface, the substrate surface defined by boundaries comprising the leading edge, the trailing edge, the first side portion and the second side portion, the substrate surface exposed to hot fluid;
a first set of cooling air micro-channels beneath the substrate surface extending from a first set of inlets proximate to the first side portion to a first set of exits proximate to the second side portion; and
a second set of cooling air micro-channels beneath the substrate surface extending from a second set of inlets proximate to the second side portion to a second set of exits proximate to the first side portion;
wherein each inlet of the first set of inlets is positioned closer to the substrate surface than at least one exit of the second set of exits;
wherein at least one inlet of the first and second sets of inlets feeds a channel side portion of at least one cooling air micro-channel of the first and second sets of cooling air micro-channels; and
wherein the channel side portion comprises a transition portion, wherein the transition portion is angled toward the substrate surface.

2. The turbine shroud block segment of claim 1, wherein at least one exit of the first and second sets of exits is linear.

3. The turbine shroud block segment of claim 1, wherein each inlet of the second set of inlets is positioned closer to the substrate surface than at least one exit of the first set of exits.

4. The turbine shroud block segment of claim 1, wherein each cooling channel of the first set of cooling air micro-channels is hook-shaped comprising more than one turn.

5. The turbine shroud block segment of claim 1, wherein each cooling channel of the first set of cooling air micro-channels is J-shaped comprising a single turn.

6. The turbine shroud block segment of claim 1, further comprising a cavity, wherein each inlet of the first and second sets of inlets is fed from the cavity.

7. The turbine shroud block segment of claim 6, wherein the cavity is fed compressed cooling air from at least one cooling flow path.

8. The turbine shroud block segment of claim 1, further comprising multiple channel side portions, wherein the channel side portions overlap each other in a direction orthogonal to the substrate surface.

9. A turbine shroud block segment comprising:
a leading edge;
a trailing edge, the trailing edge being opposite the leading edge;
a first side portion, the first side portion being substantially orthogonal to each of the leading edge and the trailing edge;
a second side portion, the second side portion being opposite the first side portion and substantially orthogonal to each of the leading edge and the trailing edge;
a substrate surface, the substrate surface defined by boundaries comprising the leading edge, the trailing edge, the first side portion and the second side portion, the substrate surface exposed to hot fluid;
a first set of cooling channels beneath the substrate surface extending from a first set of inlets proximate to the first side portion to a first set of exits proximate to the second side portion; and
wherein each cooling channel of the first set of cooling channels comprises a channel side portion adjacent the first side portion; and
wherein each channel side portion is at least partially radially inward or radially outward of an adjacent channel side portion.

10. A process of making a cooled structure comprising additively building a turbine shroud block segment according to claim 1 by at least one of: binder jetting, directed energy deposition, material extrusion, material jetting, powder bed fusion, sheet lamination, vat photopolymerization, direct metal laser melting, direct metal laser sintering, selective laser melting, electron beam melting, and mixtures thereof.

11. A gas turbine comprising:
a compressor section;
a combustion section positioned downstream from said compressor section;
a turbine section positioned downstream from said combustion section;
wherein said gas turbine comprises a plurality of cooled turbine shroud block segments, each cooled turbine shroud block segment comprising:
- a main body having a leading edge, a trailing edge, a first side portion, a second side portion, and a cavity;
- a first set of cooling channels extending from a first plurality of channel inlets proximate the first side portion, the first set of cooling channels comprising a first plurality of straight exits proximate the second side portion; and
- a second set of cooling channels extending from a second plurality of channel inlets proximate the second side portion, the second set of cooling channels comprising a second plurality of straight exits proximate the first side portion;
wherein the first plurality of channel inlets is positioned closer to a substrate surface than the second plurality of straight exits, and
wherein the second plurality of channel inlets is positioned closer to the substrate surface than the first plurality of straight exits.

12. The gas turbine of claim 11, wherein each of the first set of cooling channels and the second set of cooling channels further comprises a plurality of curved portions proximate the respective first plurality of channel inlets and second plurality of channel inlets.

13. The gas turbine of claim 12, wherein each curved portion of the plurality of curved portions is hook-shaped.

14. The gas turbine of claim 12, wherein each curved portion of the plurality of curved portions is J-shaped.

15. The gas turbine of claim 12, wherein the curved portions of each of the first set of cooling channels and the second set of cooling channels are radially inward of the second plurality of straight exits and the first plurality of straight exits respectively.

16. The gas turbine of claim 12, the main body further comprising a radially inner surface, the radially inner surface defining a boundary of a gas turbine flow path,
wherein the curved portions of each of the first plurality of channel inlets and the second plurality of channel inlets are closer to the radially inner surface than the second plurality of straight exits and the first plurality of straight exits respectively.

17. The gas turbine of claim 12, wherein each of the first set of cooling channels and the second set of cooling channels comprises a change of direction of between about 75 and about 105 degrees, via the respective curved portions.

18. The gas turbine of claim 12, wherein each of the first set of cooling channels and the second set of cooling channels comprises a change of direction of between about 130 and about 190 degrees, via the respective curved portions.

19. The gas turbine of claim 12, wherein each of the curved portions has a turn radius in the range of about 0.05 to about 13 millimeters.

20. The gas turbine of claim 11, wherein each of the first plurality of channel inlets and the second plurality of channel inlets are positioned to accept compressed cooling air from a cooling flow path.

* * * * *